United States Patent [19]

Davidson et al.

[11] Patent Number: 4,609,522
[45] Date of Patent: Sep. 2, 1986

[54] MECHANICAL DRIVE SYSTEM FOR MOVING FUEL

[75] Inventors: Albert C. Davidson, Pittsburgh; David E. Boyle, Kiski Township, Armstrong County, both of Pa.

[73] Assignee: Westinghouse Electric Corp., Pittsburgh, Pa.

[21] Appl. No.: 576,677

[22] Filed: Feb. 3, 1984

[51] Int. Cl.$^4$ .............................................. G21C 7/30
[52] U.S. Cl. .................................. 376/212; 376/230; 376/349; 376/435
[58] Field of Search .............. 376/207, 212, 428, 435, 376/463, 409, 347, 349, 230, 158, 170, 171, 172, 173, 182, 209

[56] References Cited

U.S. PATENT DOCUMENTS

| | | | |
|---|---|---|---|
| 3,188,276 | 6/1965 | Aranovitch et al. | 376/212 |
| 3,362,882 | 1/1968 | Sofer et al. | 376/173 |
| 3,671,392 | 6/1972 | Beaudoin et al. | 376/173 |
| 3,989,589 | 11/1976 | Frisch et al. | 376/230 |
| 4,096,033 | 6/1978 | Barry | 376/435 |

FOREIGN PATENT DOCUMENTS 110693  4/1961  Pakistan ........................... 376/428

Primary Examiner—Charles T. Jordan
Assistant Examiner—Richard Klein
Attorney, Agent, or Firm—Daniel C. Abeles

[57] ABSTRACT

A mechanical drive system (10) for moving alternate nuclear reactor fuel rods (14) within the nuclear reactor core (12) and relative to the remaining stationary nuclear reactor fuel rods (16) so as to axially displace the movable fuel rods (14), and enriched and natural uranium fuel zones defined therein, relative to similarly defined enriched and natural uranium fuel zones within the stationary fuel rods (16) in order to optimize utilization of excess or free neutrons produced within the nuclear reactor core within a fuel cycle. The nuclear reactor fuel rods (14, 16) all have a length which is less than that of standard-sized nuclear reactor fuel rods, and therefore, a plenum chamber (20) is able to be defined between an upper core plate (22) and an auxiliary upper core plate (24). A drive plate grid assembly (36, 38) is attached to the movable fuel rods (14), and hydraulic drive mechanisms (46) move the grid assembly (36, 38) and the movable fuel rods (14) so as to axially displace the fuel rods (14) relative to the stationary fuel rods (16) whereby the enriched and natural uranium fuel zones defined within the fuel rods (14, 16) optimally operationally interface throughout the fuel cycle. The movable fuel rods (14) are progressively moved during the fuel cycle such that at the beginning of the fuel cycle, the enriched and natural uranium fuel zones defined between adjacent fuel rods (14, 16) are misaligned, while at the end of the fuel cycle, the fuel zones are aligned in horizontal layers.

20 Claims, 3 Drawing Figures

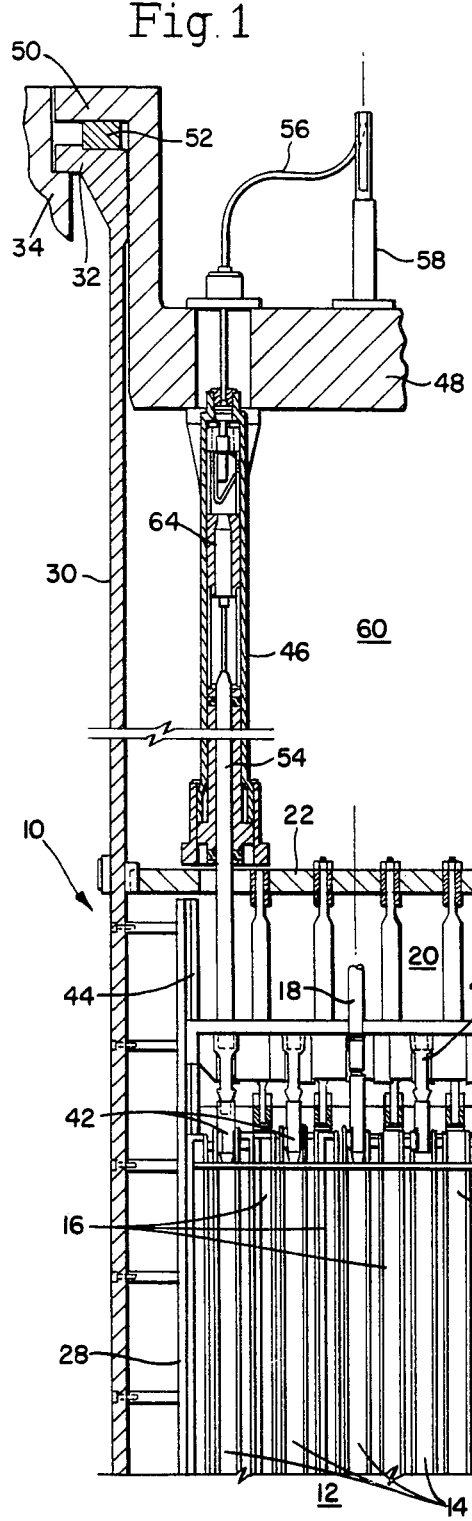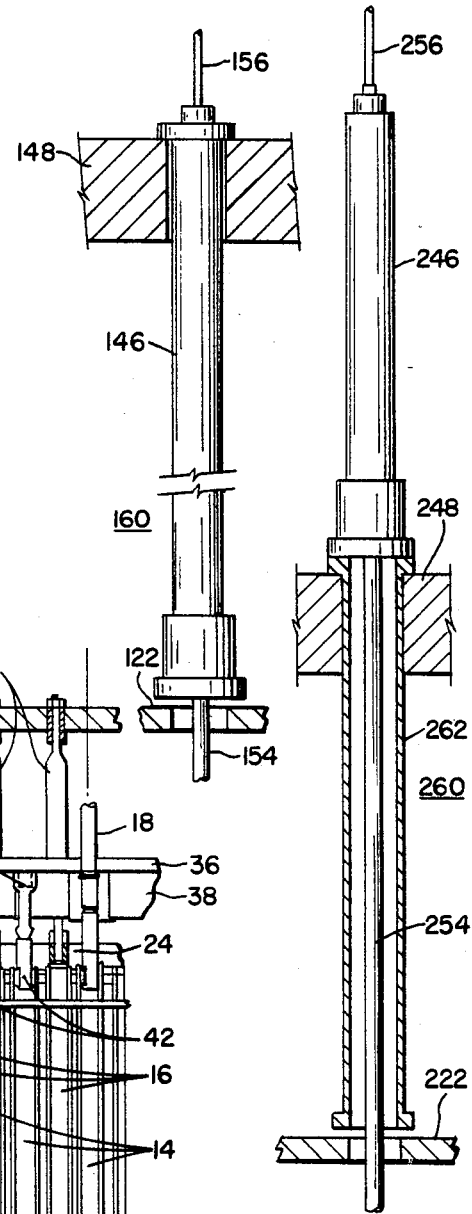
U.S. Patent    Sep. 2, 1986    4,609,522
Fig.1  Fig.2  Fig.3

MECHANICAL DRIVE SYSTEM FOR MOVING FUEL

BACKGROUND OF THE INVENTION

1. Field of the Invention

The present invention relates generally to nuclear reactor power plants or facilities, and more particularly to a new and improved mechanical drive system for moving alternate nuclear reactor fuel rods within the nuclear reactor core fuel assemblies so as to optimize excess or free neutron utilization in the economically useful production of additional nuclear reactor plutonium fuel, in lieu of permitting a substantial proportion of such excess or free neutrons to be parasitically absorbed by means of the nuclear reactor core neutron absorbing materials, such as, for example, soluble boron poisons dissolved within the core coolant, whereby the boron transmutes into various isotopes which are economically useless in connection with the operation of the nuclear reactor facility or power plant.

2. Description of the Prior Art

In conventional nuclear reactor power plants or facilities, the fuel disposed within the nuclear reactor fuel rods is usually in the form of cylindrical pellets of uranium dioxide ($UO_2$), and the uranium component is enriched uranium as opposed to natural uranium. Enriched uranium has a substantially higher proportion of U-235, and a correspondingly lower proportion of U-238, contained therein than is characteristic of natural uranium, and is therefore considerably more expensive than natural uranium. Nuclear reactor power plants or facilities cannot, however, utilize nuclear fuel which is entirely comprised of natural uranium in view of the fact that natural uranium does not exhibit sufficient reactivity as to render the reactor, and the fission reactions or processes thereof, critical. A reactor is considered to be critical when each fission reaction or process leads to or produces one other fission process or reaction. Correspondingly, a reactor is considered to be sub-critical when, on the average, each fission process or reaction leads to or produces less than one further or additional fission reaction or process, and similarly, the reactor is considered to be super-critical when each fission reaction or process, on the average, leads to or produces more than one further or additional fission reaction or process.

Reactivity is a measure of the number of excess or free neutrons which are produced by means of the reactor fission reactions or processes and which are therefore available for use in the production or generation of subsequent or additional fission reactions or processes, it being appreciated that at least one excess or free neutron is required for an additional or subsequent fission process or reaction to be achieved in order to sustain the reactor's fission chain reaction and to maintain the reactor critical. Reactivity may therefore be considered to be either positive, zero, or negative, zero reactivity corresponding to a critical power state within the reactor. In order to therefore provide the reactor with the longest possible fuel life cycle, conventional reactors employ only enriched uranium fuel within the reactor fuel rods in view of the fact that enriched uranium exhibits the highest possible degree or level of reactivity, which high degree or level of reactivity becomes increasingly more important as the particular fuel cycle proceeds. More particularly, a better appreciation for the operation of a commercial nuclear reactor power plant or facility may be attained from the broad conceptual axiom that the reactor will in fact exhibit a greater degree or level of reactivity at the beginning of a fuel cycle than in the middle of a fuel cycle or at the end of a fuel cycle in view of the fact that reactivity is dependent upon, or is a function of, the amount of fuel within the core. The reactivity of the reactor core therefore progressively declines from the beginning of the fuel cycle to the end of the fuel cycle, wherein the end of the fuel cycle is determined by that point at which the reactor exhibits insufficient reactivity to maintain the fission chain reaction.

Reactivity control within a typical nuclear reactor power plant or facility is conventionally accomplished through several different means, such as, for example, neutron absorbing control rods, burnable poisons, and poisons dissolved within the reactor coolant, with the former two means being conventionally utilized for incremental or stepwise and continuous reactor power adjustment functions or operations, respectively, while the latter means is conventionally employed for true continuous reactivity control over the fission processes or reactions throughout the reactor in a uniform manner in view of the fact that the soluble poisons, such as, for example, boron, are disposed within the core coolant which is present throughout the core as opposed to the specific or concentrated locations of the control rods and burnable poisons.

In view of the foregoing operational characteristics of the reactor to the effect that the reactivity thereof is substantially greater at the beginning of the fuel cycle than in the middle of the fuel cycle, or at the end of the fuel cycle, it naturally follows that substantial reactivity control must be exercised in the beginning stages of the fuel cycle in order to effectively restrain the core reactivity, whereas such reactivity controls must be relaxed as the fuel cycle proceeds, and particularly as the fuel cycle approaches its end, in order to effectively permit the core to exhibit sufficient reactivity so as to sustain the reactor's fission chain reaction. This difference in reactivity control function or operational levels is achieved by varying the percentage amount of the soluble boron poisons within the reactor core coolant. In particular, as the fuel cycle proceeds, the amount of soluble boron poisons present within the reactor core coolant is progressively reduced, or in other words, a predetermined percentage amount of the poisons is continuously removed from the core coolant.

In the performance of the reactivity control functions or operations by means of the soluble boron poisons, it is of course appreciated that the poisons parasitically absorb the excess neutrons whereby the boron is transmuted into various isotopes. While this mode of operation is therefore certainly one means of effectively controlling the reactivity of the nuclear reactor throughout its core fuel life cycle, the neutron-absorbing poisons absorb neutrons and effectively remove them from the core in an essentially wasteful manner in that the neutrons are effectively consumed without producing any useful product, such as, for example, additional plutonium fuel. Consequently, the conventional mode of operation of the nuclear reactor power plant or facility is seen to comprise a relatively inefficient depletion or consumption of the uranium fuel which, viewed from a different perspective, effectively results in greater fuel costs than could otherwise be achieved. If in lieu of the conventional consumption of the reactor core fuel, and the reactivity control operatively associated therewith, means could be developed wherein the excess neutrons were effectively utilized in the useful production of additional plutonium fuel, as opposed to simply being absorbed by the boron poisons so as to result in the economically useless production of various isotopes, the reactivity level of the reactor core would be enhanced and the fuel cycle life of the reactor core would be significantly extended resulting in considerably lower fuel costs.

Accordingly, it is an object of the present invention to provide new and improved means for optimizing utilization of free or excess neutrons generated within the reactor core by means of the fission processes or reactions.

Another object of the present invention is to provide new and improved means for optimizing utilization of excess or free neutrons generated within the reactor core by means of the fission processes or reactions so as to achieve reactivity control of the reactor core in an economically enhanced manner.

Yet another object of the present invention is to provide new and improved means for optimizing utilization of free or excess neutrons generated within the reactor core by means of the fission processes or reactions so as to produce additional plutonium fuel.

Still another object of the present invention is to provide new and improved means for optimizing utilization of free or excess neutrons generated within the reactor core by means of the fission processes or reactions so as to substantially extend the fuel cycle or fuel service life of the reactor core.

Yet still another object of the present invention is to provide new and improved means for optimizing utilization of free or excess neutrons generated within the reactor core by means of the fission reactions or processes so as to achieve maximization of fuel cycle cost benefits.

Still yet another object of the present invention is to provide new and improved means for optimizing utilization of free or excess neutrons generated within the reactor core by means of the fission processes or reactions wherein the new and improved means of the present invention is applicable to existing power plants and facilities whereby the same may be retrofitted with the system of the present invention.

SUMMARY OF THE INVENTION

The foregoing and other objectives of the present invention are achieved in accordance with the present invention through the provision of an axially and radially defined fuel zone system within the nuclear reactor core fuel rods wherein each fuel rod is provided with vertically alternating zones of enriched and natural uranium fuel, the height of each zone layer being approximately eighteen inches (18") or one and one-half feet (1.5'). Adjacently disposed fuel rods would have their enriched and natural zones alternating in the radial or transverse direction such that, with the exception of the uppermost zones of enriched uranium fuel within the particular alternating fuel rods, all enriched uranium fuel zones would be effectively surrounded by zones of natural uranium fuel. In this manner, as the fission processes or reactions occur within the reactor core, the excess or free neutrons generated by the enriched uranium fuel will have an increased likelihood of encountering the natural uranium fuel which effectively surrounds the enriched uranium fuel locations whereby the likelihood of plutonium production and burning of the same by means of such free or excess neutrons from the enriched uranium fuel is enhanced, and the likelihood of wasteful absorption of such free or excess neutrons by means of the boron poisons dissolved within the reactor core coolant is correspondingly reduced.

As the fuel cycle proceeds, it is subsequently desired to align the horizontally, radially, or transversely disposed enriched uranium fuel zones within the fuel rods, as well as, of course, the natural uranium fuel zones within the fuel rods. The reason for this is that as the fuel cycle proceeds, the reactivity of the reactor core is being constantly reduced, and consequently, it is desired to produce or preserve as much reactivity within the core as is possible. In view of the fact enriched uranium fuel produces an excess number of neutrons per fission reaction or process, whereas natural uranium fuel, on the average, consumes more neutrons than is generated per fission reaction or process, reactivity is enhanced as much as is possible if, as the fuel cycle proceeds, alternate fuel rods are moved vertically upwardly or downwardly so as to radially or transversely align the enriched and natural uranium zones within the fuel rods within horizontally extending planes. Accordingly, such alternate fuel rods are progressively moved vertically upwardly or downwardly such that when the reactor core is approaching its end of cycle, the enriched and natural fuel zones will be fully aligned. When the uranium fuel zones are in this mode, it may be appreciated that the likelihood of absorption of the excess neutrons generated by means of the fission reactions of the enriched uranium fuel into the natural uranium fuel has been substantially reduced whereby such free or excess neutrons have their likelihood of further fission increased. In this manner, the reactivity of the reactor core is enhanced or preserved to the extent best possible.

In accordance with the foregoing, the present invention further comprises a system for moving the alternative fuel rods within the reactor core so as to achieve the foregoing objectives. In particular, the moving system of the present invention initially comprises the provision of fuel assembly fuel rods which are approximately two feet shorter in length than conventional fuel rods. In this manner, a two-foot high plenum chamber is defined between the fuel rods and the existing or conventional upper core plate. An auxiliary upper core plate is fixedly suspended from the upper core plate by means of a transversely extending array of horizontally or radially spaced secondary support columns so as to engage the shortened fuel assemblies. A drive plate, in the form of a grid which can move vertically relative to the secondary support columns and the reactor core control rod drive rod structures, is provided with transversely or radially spaced dependent gripper elements which are fixed to alternate fuel rods through means of fuel assembly spiders. Hydraulic drive mechanisms, which have replaced a predetermined number of control rod drive rods, are peripherally disposed about the core and are connected to the drive plate grid for moving the same in an upwardly or downwardly elevational mode in accordance with the fuel alignment or misalignment operations of the present invention. Guide rails are provided within the two-foot plenum chamber at 90° azimuthal locations disposed about the periphery of the core for facilating guidance and movement of the drive plate grid in its vertical movement mode. Roller bearings may be provided upon the drive plate grid for operationally interfacing with the guide rails. The hydraulic drive mechanisms are interposed, in accordance with one embodiment of the present invention, between the upper core plate and the core upper support plate. In an alternative embodiment, the hydraulic drive mechanisms may be suspendingly supported from the upper support plate, or still further, each one of the hydraulic drive mechanisms may be entirely disposed above the upper support plate wherein a hydraulic drive rod projects downwardly through the upper plenum defined between the upper support plate and the upper core plate so as to nevertheless be drivingly connected with the drive plate grid. In the latter embodiment, a shroud would be suspendingly supported from the upper support plate so as to extend downwardly through the upper plenum in a surrounding relationship relative to the hydraulic drive rod so as to protect the same against cross-flow of reactor coolant.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is an elevational view, partly in cross-section, of a first embodiment of the new and improved mechanical drive system of the present invention, showing the cooperative parts thereof, for vertically moving alternate nuclear reactor fuel rods within the reactor core so as to align or misalign adjacent fuel rods with zones of enriched and natural uranium fuel in alternate vertical and horizontal arrays as required in order to maximize excess or free neutron utilization within the core during normal reactor operations;

FIG. 2 is a partial elevational view of a second embodiment of the present invention wherein a hydraulic drive mechanism, similar to that utilized within the embodiment of FIG. 1, is suspendingly supported from the nuclear reactor upper support plate; and FIG. 3 is a partial elevational view of a third embodiment of the present invention wherein a hydraulic drive mechanism, similar to that utilized within the embodiment of FIG. 2, is disposed entirely above the reactor upper support plate with the hydraulic drive rod thereof extending downwardly through the upper plenum.

DESCRIPTION OF THE ILLUSTRATED EMBODIMENTS

Referring now to the drawings, and more particularly to FIG. 1 thereof, there is shown the new and improved mechanical drive system of the present invention as generally indicated by the reference character 10. As has been noted hereinbefore, in order to maximize or optimize the utilization of free or excess neutrons generated within the nuclear reactor core as a result of the fission reactions or processes, all of the fuel rods of the nuclear reactor core 12 are, in lieu of conventional nuclear fuel loading comprising only enriched uranium fuel, provided with vertically arranged or layered zones of enriched and natural uranium fuel, and adjacent or alternate fuel rods 14 will have their enriched and natural uranium fuel zones disposed in a misaligned arrangement or disposition relative to their alternate or adjacent fuel rods 16, exceptions to the overall pattern being made throughout the core at the control rod locations as denoted by the control rod drive lines 18. As an example, then, the arrangement of the nuclear fuel may be schematically designated as follows, with an E designating an enriched zone of uranium fuel within a particular fuel rod 14 or 16, while N designates a natural uranium fuel zone within a particular fuel rod 14 or 16:

| E | N | E | N | E | N | E |
|---|---|---|---|---|---|---|
| N | E | N | E | N | E | N |
| E | N | E | N | E | N | E |
| N | E | N | E | N | E | N |
| E | N | E | N | E | N | E |

Each of the uranium fuel zones is eighteen inches (18") or one and one-half feet (1.5') high, and it is seen that except for the outermost or peripheral fuel rods, as well as those fuel rods disposed internally of the core but with the enriched zones of uranium fuel E disposed at the top of each fuel rod, all other enriched zones E of uranium fuel within the fuel rods 14 or 16 are effectively surrounded by zones N of natural uranium fuel. In this manner, during normal operation of the reactor, the excess or free neutrons generated by means of the enriched fuel zones E of the rods 14 and 16 will more than likely encounter the neighboring zones of natural uranium fuel N whereby, in lieu of such excess or free neutrons being uselessly absorbed within the soluble boron poisons dissolved within the reactor core coolant, the excess or free neutrons will have their chances considerably improved of being absorbed within the zones of natural uranium fuel N for the production of useful plutonium fuel.

During the early stages of the reactor fuel cycle, the aforenoted arrangement of the fuel rods 14 and 16 is required in view of the fact that reactivity is greatest at such time and it is desired to utilize such relatively large number of excess or free neutrons being generated by the enriched fuel E to encounter, and be absorbed by, the natural uranium fuel N whereby the same will be converted into additional plutonium fuel. As the reactor fuel cycle proceeds, however, and reactivity of the core begins to diminish, it is desired to limit the amount of absorption of the generated excess or free neutrons, generated by the enriched uranium fuel E, within the natural uranium fuel N, because it is desired to enhance or preserve, as much as is possible, the reactivity of the core. Consequently, in order to limit such absorption of the free or excess neutrons within the natural uranium fuel N, and to augment the core reactivity as much as possible, the fuel rods 14 and 16 are moved relative to each other so as to therefore re-align the enriched uranium fuel zones E and the natural uranium fuel zones N within horizontal planes throughout the core. As an example, such an arrangement of the nuclear fuel within the fuel rods may now be schematically designated as follows, it being noted that alternative fuel rods 14 have been elevated relative to fixed fuel rods 16, however, movable fuel rods 14 may likewise in accordance with the teachings of the present invention be moved downwardly relative to the fixed fuel rods 16 so as to achieve the aforenoted horizontally aligned array of the enriched and natural uranium fuel zones E and N, respectively:

| E | E | E | E |
|---|---|---|---|

| | | | | | | |
|---|---|---|---|---|---|---|
| N | N | N | N | N | N | N |
| E | E | E | E | E | E | E |
| N | N | N | N | N | N | N |
| E | E | E | E | E | E | E |
| | N | | N | | N | |

The apparatus of the present invention has been developed in order to achieve the aforenoted vertical movement of alternate fuel rods 14 relative to fixed fuel rods 16 in order to achieve the aforenoted reactivity control and optimal fuel utilization objectives. It is noted that in operation of the nuclear reactor in accordance with the present invention, the reactor is always operating under a thermal mode wherein thermal neutrons are producing plutonium fuel, and accordingly, such plutonium fuel may be readily burned by means of additional thermal neutrons. In accordance with the present invention, all of the fuel rods 14 and 16 have been shortened by a length of two feet (2') relative to conventional fuel rods, and therefore a plenum chamber 20 is defined between the reactor upper core plate 22 and the fuel assemblies comprising fuel rods 14 and 16. An auxiliary upper core plate 24 is suspendingly supported from the upper core plate 22 by means of a plurality of vertically extending, laterally spaced, secondary support columns 26, the auxiliary upper core plate 24 being operatively connected to the fuel assemblies by means of holddown springs, not shown. The outer periphery of the auxiliary upper core plate 24 has its configuration matched to that of the inside peripheral surface of the lower internals baffle 28 which encloses the irregular periphery of the core 12. The lower internals baffle 28 is of course fixedly secured to the core barrel 30, the upper peripherally flanged portion 32 of which is seated upon reactor pressure vessel ledge 34.

The specific means for accomplishing the relative vertical movement of the movable fuel rods 14 with respect to the fixed fuel rods 16 is seen to comprise a drive plate 36 to the bottom of which is integrally formed a drive plate grid 38. In this manner, the integral drive plate and drive plate grid structure 36–38 may be able to be moved vertically relative to the lower ends of the secondary support columns 26 which extend down to the auxiliary upper core plate 24, as well as being capable of moving vertically relative to the control rod drive lines 18. A plurality of gripper assemblies 40 are suspendingly affixed to the underside of drive plate 36, the gripper assemblies 40 being similar to those employed upon refueling machines. The gripper assemblies 40, in turn, operationally connect to spider assemblies 42 affixed to the upper ends of the particular movable fuel rods 14. In this manner, elevational or vertical movement of the drive plate 36 results in the ganged movement of the movable fuel rods 14 so as to achieve the misalignment or alignment of the fuel rod zones of enriched fuel E or natural fuel N as desired during different operative periods of the fuel cycle.

In order to facilitate the vertical or elevational movement of the drive plate 36, drive grid 38, and the movable fuel rods 14, four vertically extending guide rails 44 are affixed to the upper end of the core barrel baffle 28 at equiangular, 90° azimuthal locations disposed about the periphery of the core. Roller bearings, not shown, may be fitted upon the drive plate 36 so as to facilitate the readily smooth sliding movement of the drive plate 36 relative to the guide rails 44. Movement of the drive plate 36, and thus the movable fuel rods 14, is attained through the provision of, for example, eight hydraulic drive mechanisms 46 disposed within the upper plenum of the reactor which is defined between the upper core plate 22 and an upper support plate 48, the latter of which is seated atop the core barrel flange 32 through means of its own peripheral flange 50 and the intermediary of a holddown spring assembly 52. The hydraulic drive mechanisms 46 are located at former locations of control rod guide tubes, and each mechanism 46 includes a hydraulic drive rod 54 which extends downwardly through upper core plate 22 so as to be operatively connected to the drive plate 36. The hydraulic drive mechanisms 46 are disposed in a peripheral array at 45° equiangularly separated azimuthal positions about the core, and are fixedly interposed between the upper core plate 22 and the upper support plate 48. Hydraulic conduit means 56 is connected to a source of suitable hydraulic power fluid, not shown, and may be routed through the reactor thermocouple column 58.

In lieu of mounting the hydraulic drive mechanisms 46 between the upper core plate 22 and the upper support plate 48, the hydraulic drive mechanisms 146 may be mounted upon the upper support plate 148 in a dependent manner as seen in accordance with the embodiment of FIG. 2. It is to be noted that all of the corresponding parts of the system of the present invention have been given similar reference characters except that in the embodiment of FIG. 2, all of the reference characters are within the 100 series. Similarly, in lieu of housing the hydraulic drive mechanisms within the upper plenum chamber 60, it may be desired to house the hydraulic drive mechanisms 246 at locations elevationally above the upper support plate 248. In accordance with this embodiment, the hydraulic drive mechanisms 246 are seated atop a vertically disposed guide tube 262 which is suspendingly mounted within the upper support plate 248 so as to extend downwardly into the upper plenum 260. The hydraulic drive rod 254 of each hydraulic drive mechanism 246 is housed internally of the guide tube 262 so as to protect the drive rod 254 from cross-flow currents of the reactor coolant within the upper plenum 260. In view of the fact that the upper plenum 260 is a considerably hot region of the reactor, such an arrangement will be most beneficial for the hydraulic drive mechanisms. It is noted that in the embodiment of FIG. 3, all corresponding parts of the structural system of the present invention have been designated with 200 series reference characters. It is also to be noted that in connection with all of the hydraulic drive mechanisms 46, 146, and 246, the hydraulic drive mechanisms are internally provided with a suitable lock housing 64 whereby the hydraulic drive mechanism drive rods 54, 154, or 254 are lockingly retained in their upper elevated modes. Still further, if load forces permit, conventional part-length drive mechanisms, not shown, but located externally of the reactor closure head, also not shown, may be utilized in lieu of the hydraulic drive mechanisms 46, 146, or 246 as disclosed in the various embodiments of the present invention. Regardless of which hydraulic drive mechanism dispositional embodiment 46, 146, or 246 of FIGS. 1–3, respectively, is also employed within the reactor facility, positioning coils, not shown, similar to rod position indicator (RPI) coils conventionally employed in connection with control rod drive mechanisms (CRDMs), may be utilized in order to monitor or control the disposition of the hydraulic drive mechanisms 46, 146, or 246.

Thus it may be seen that the present invention has provided new and improved means for implementing the vertical movement of axially zoned nuclear reactor fuel rods so as to achieve misalignment or alignment patterns of the fuel rods as required in furtherance of the optimization of the free or excess neutron utilization in the economically useful production of plutonium fuel. With the present invention, fuel cycle cost benefits have been forecast to be within the range of 15-20%. Such results of course compare extremely favorably with respect to other conventional means or attempts to economically utilize free or excess neutrons in the production of, for example, additional plutonium fuel, and in addition, these results mean that with such a system as has been developed and disclosed herein, the reactor fuel cycles are considerably extended with an immediate positive effect upon fuel costs. Still further, in view of the fact that the fuel cycles have been considerably extended, fewer refueling operations, per period of time, will have to be conducted which is additionally cost effective or beneficial, particularly in light of maintenance man-power expended and non-power-generating down time of the facility.

Obviously, many modifications and variations of the present invention are possible in light of the above teachings. For example, while there has been disclosed a particular array or arrangement of the enriched E and natural N uranium fuel zones within the core of the nuclear reactor, other arrays or arrangements of such fuel zones within the core are of course possible as long as there is an interfacial operation between the enriched and natural uranium fuel zones E and N, respectively, so as to achieve the plutonium production and reactivity control objectives of the present invention. In addition, it is to be appreciated that while the present invention disclosure has specifically been directed to the vertical movement of alternative nuclear reactor fuel rods, similar conceptual systems may likewise be implemented with respect to the vertical movement of alternative fuel assemblies. Still further, the principles of the present invention may quite simply be implemented within existing commercial power plants in a retrofitted manner. It is therefore to be understood that within the scope of the appended claims, the present invention may be practiced otherwise than as specifically described herein.

We claim:

1. A nuclear reactor, comprising:
   a plurality of nuclear reactor fuel rods defining a nuclear reactor core;
   zones of enriched and natural uranium fuel defined within each of said nuclear reactor fuel rods;
   an upper core plate;
   an auxiliary upper core plate fixedly connected to a first stationary set of said nuclear reactor fuel rods and spaced below said upper core plate so as to define a plenum chamber between said upper and auxiliary upper core plates; and
   means disposed above said upper core plate and extending through said upper core plate so as to be connected to a second set of said nuclear reactor fuel rods for vertically moving said second set of said nuclear reactor fuel rods, and said zones of enriched and natural uranium fuel defined therein, relative to said first stationary set of said nuclear reactor fuel rods, and said zones of enriched and natural uranium fuel defined therein, within said nuclear reactor core and said plenum chamber during an operative fuel cycle for predeterminedly operatively interfacing said zones of enriched and natural uranium fuel defined within all of said nuclear reactor fuel rods so as to optimize the utilization of free or excess neutrons produced within said nuclear reactor core throughout said fuel cycle.

2. A nuclear reactor as set forth in claim 1, wherein:
   all of said nuclear reactor fuel rods have a length dimension which is less than that of standard nuclear reactor fuel rods so as to facilitate definition of said plenum chamber defined between said upper core plate and said auxiliary upper core plate.

3. A nuclear reactor as set forth in claim 1, wherein:
   said zones of enriched and natural uranium fuel are alternatively defined within each of said nuclear reactor fuel rods as well as between adjacent nuclear reactor fuel rods.

4. A nuclear reactor as set forth in claim 1, wherein:
   said means for moving said second set of said nuclear reactor fuel rods is connected to alternate nuclear reactor fuel rods.

5. A nuclear reactor as set forth in claim 1, wherein:
   said moving means comprises hydraulic drive mechanisms.

6. A nuclear reactor as set forth in claim 1, wherein:
   said moving means is disposed above said upper core plate.

7. A nuclear reactor as set forth in claim 1, further comprising:
   a moving plate fixedly connected to said drive means; and
   means connecting said drive plate to said second set of said nuclear reactor fuel rods.

8. A nuclear reactor as set forth in claim 7, further comprising:
   vertically oriented guide rails disposed within said plenum chamber and operatively connected to said drive plate for guiding said drive plate during said vertical movements through said plenum chamber.

9. A nuclear reactor as set forth in claim 1, wherein:
   said moving means comprises eight hydraulic drive mechanisms disposed equiangularly about the periphery of said nuclear reactor core.

10. A nuclear reactor as set forth in claim 8, wherein:
    four of said guide rails are equiangularly disposed about the periphery of said nuclear reactor core.

11. A nuclear reactor as set forth in claim 7, further comprising:
    support columns extending between said upper core plate and said auxiliary upper core plate; and
    said drive plate comprises a grid for permitting said drive plate to move vertically within said plenum chamber relative to said support columns.

12. A nuclear reactor as set forth in claim 1, further comprising:
    an upper support plate; and
    said moving means is suspendingly supported from said upper support plate.

13. A nuclear reactor as set forth in claim 1, further comprising:
    an upper support plate; and
    said moving means is disposed above said upper support plate.

14. A nuclear reactor as set forth in claim 13, further comprising:

an upper plenum defined between said upper support plate and said upper core plate;

a drive rod operatively connected between said moving means and said second set of said nuclear reactor fuel rods, and passing through said upper plenum; and guide tube means fixedly supported upon said upper support plate and disposed within said upper plenum for surroundingly encasing said drive rod within said upper plenum.

15. A nuclear reactor, comprising:

a plurality of nuclear reactor fuel rods defining a nuclear reactor core;

said plurality of nuclear reactor fuel rods including a first set of stationary nuclear reactor fuel rods having zones of enriched and natural uranium fuel, all of said zones being of substantially the same predetermined axial length, defined within each of said stationary nuclear reactor fuel rods such that an array of alternative enriched and natural unranium fuel zones is defined in an axial columnar direction within each of said stationary nuclear reactor fuel rods;

said plurality of nuclear reactor fuel rods additionally including a second set of nuclear reactor fuel rods, alternatively disposed with respect to said first set of stationary nuclear reactor fuel rods within said nuclear reactor core and having zones of natural and enriched uranium fuel, all of said zones being of said substantially same predetermined axial length, defined within each of said nuclear reactor fuel rods such that an array of alternative natural and enriched uranium fuel zones is defined in an axial columnar direction within each of said nuclear reactor fuel rods of said second set, which are axially movable with respect to said first set of stationary nuclear reactor fuel rods between a first fuel cycle-commencement position at which said enriched and natural uranium fuel zones of said first and second sets of nuclear reactor fuel rods are disposed in an alternative array which extends in the transverse radial direction throughout said nuclear reactor core, and a second fuel cycle-end position at which said enriched and natural uranium fuel zones of said first and second sets of nuclear reactor fuel rods are disposed in aligned, radially extending rows throughout said nuclear reactor core;

an upper core plate;

an auxiliary upper core plate fixedly connected to said first stationary set of said nuclear reactor fuel rods and spaced below said upper core plate so as to define a plenum chamber between said upper and auxiliary upper core plates; and means disposed above said upper core plate and extending through said upper core plate so as to be connected to said second set of nuclear reactor fuel rods for moving said second set of nuclear reactor fuel rods, and said zones of enriched and natural uranium fuel defined therein, a distance substantially corresponding to said predetermined axial length of said enriched and natural uranium fuel zones of said first and second sets of nuclear reactor fuel rods, relative to said first set of stationary nuclear reactor ruel rods and said zones of enriched and natural uranium fuel defined therein, within said nuclear reactor core and said plenum chamber between said first and second positions within an operative fuel cycle for predeterminedly operatively interfacing said zones if enriched and natural uranium fuel defined within all of said nuclear reactor fuel rods so as to optimize the utilization of free or excess neutrons produced within said nuclear reactor core throughout said fuel cycle.

16. A nuclear reactor as set forth in claim 15, wherein:

said moving means includes drive means for continuously moving said second set of nuclear reactor fuel rods relative to said stationary nuclear reactor fuel rods throughout said fuel cycle.

17. A method of operating a nuclear reactor, comprising the steps of:

providing a plurality of nuclear reactor fuel rods so as to define a nuclear reactor core;

establishing a first set of stationary nuclear reactor fuel rods from said plurality of nuclear reactor fuel rods wherein each of said stationary fuel rods is provided with zones of enriched and natural uranium fuel arranged alternatively in the axial columnar direction;

establishing a second set of movable nuclear reactor fuel rods from said plurality of nuclear reactor fuel rods wherein each of said movable fuel rods is provided with zones of enriched and natural uranium fuel arranged alternatively in the axial columnar direction;

disposing said second set of movable nuclear reactor fuel rods in an alternative arrangement with respect to said first set of stationary nuclear reactor fuel rods throughout said nuclear reactor core;

disposing said second set of movable nuclear reactor fuel rods at a first fuel cycle-commencement position within said nuclear reactor core and relative to said first set of stationary nuclear reactor fuel rods such that said zones of enriched and natural uranium fuel defined within said nuclear reactor fuel rods of said first and second sets of nuclear reactor fuel rods are arranged in an alternative array in the transverse radial direction throughout said nuclear reactor core; and moving said second set of movable nuclear reactor fuel rods relative to said first set of stationary nuclear reactor fuel rods, during said fuel cycle, from said first fuel cycle-commencement position to a second fuel cycle-end position at which said zones of enriched and natural uranium fuel defined within said nuclear reactor fuel rods of said first and second sets of nuclear reactor fuel rods will be arranged in aligned, radially extending rows throughout said nuclear reactor core, whereby the utilization of free or excess neutrons produced within said nuclear reactor core throughout said fuel cycle, and the reactivity of said nuclear reactor core, is optimized.

18. A method as set forth in claim 17, wherein:

said second set of nuclear reactor fuel rods are continuously moved relative to said first set of nuclear reactor fuel rods throughout said fuel cycle.

19. A method of operating a nuclear reactor as set forth in claim 17, wherein:

all of said zones of said enriched and natural uranium fuel defined within said first and second sets of nuclear reactor fuel rods are provided with substantially the same predetermined axial length.

20. A method as set forth in claim 19, wherein:

said second set of movable nuclear reactor fuel rods are moved between said first fuel cycle-commencement position to said second fuel cycle-end position a distance substantially corresponding to said predetermined axial length of said enriched and natural uranium fuel zones of said first and second sets of nuclear reactor fuel rods.

* * * * *